Dec. 9, 1924.

J. A. FLORO ET AL

TIRE RIM

Filed May 10, 1924 — 2 Sheets-Sheet 1

1,518,782

Inventor
John A. Floro & Herman M. Carley
By Wm. E. Dye
Attorney

Dec. 9, 1924.
J. A. FLORO ET AL
TIRE RIM
Filed May 10, 1924
1,518,782
2 Sheets-Sheet 2
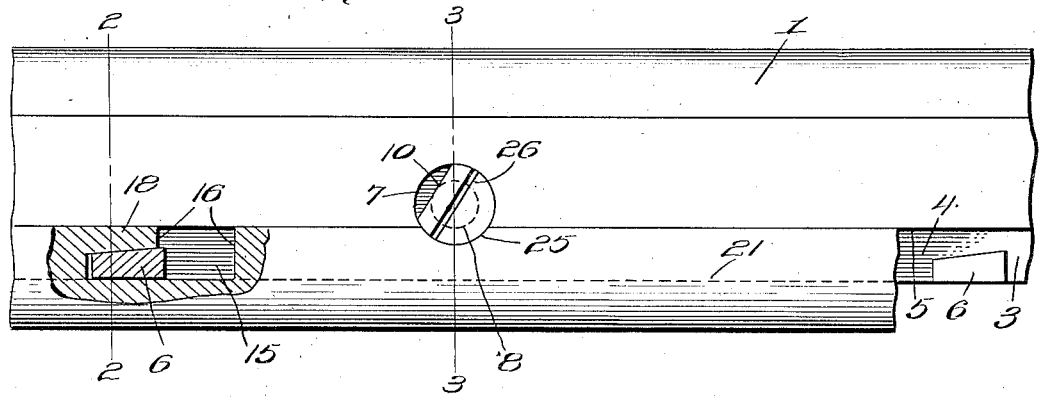
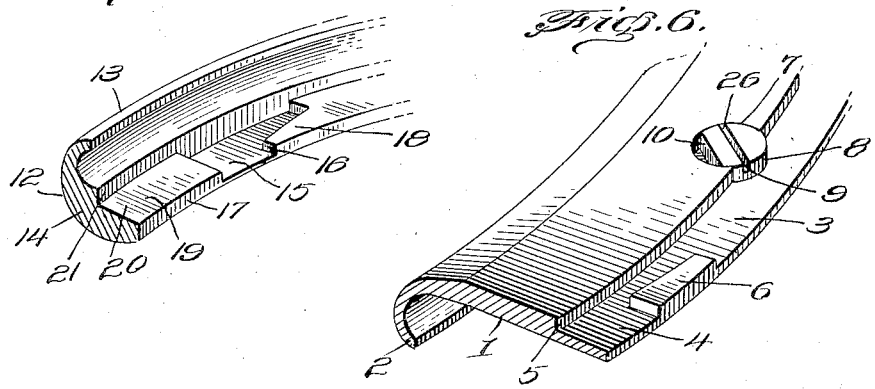
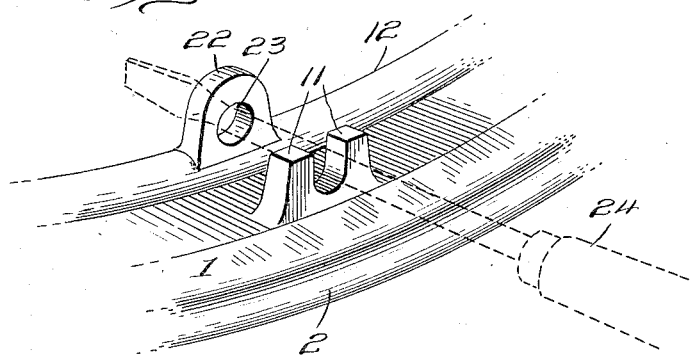

Patented Dec. 9, 1924.

1,518,782

UNITED STATES PATENT OFFICE.

JOHN A. FLORO AND HERMAN McCARLEY, OF CHRISTOPHER, ILLINOIS.

TIRE RIM.

Application filed May 10, 1924. Serial No. 712,249.

*To all whom it may concern:*

Be it known that we, JOHN A. FLORO and HERMAN McCARLEY, citizens of the United States, residing at Christopher, in the county of Franklin and State of Illinois, have invented certain new and useful Improvements in Tire Rims; and we do hereby declare the following to be a full, clear, and exact description of the invention, such as will enable others skilled in the art to which it appertains to make and use the same.

This invention relates to improvements in motor vehicle wheels and more particularly to improved demountable tire rims.

It is well known to automobile users and motor vehicle mechanics, that it is very difficult to place a tire on or remove a tire from the ordinary channel-shaped rim. This is due to the fact that the flanges at the sides of the channel extend outwardly beyond the bottom of the channel, and consequently in placing a tire on the rim or removing a tire from the latter, it is necessary to stretch the tire to such an extent that it will pass over one of the flanges. Efforts have been made to construct rims, to overcome this disadvantage, but so far as we are informed, these efforts have not been in a practical direction.

The primary object of the present invention is to provide a tire rim formed of two sections, each section being a complete ring, and means being provided to detachably connect these sections or rings.

Another object of the invention is to provide a tire rim split circumferentially into two ring-like sections, and to connect these sections by concealed joints, so that the joining elements will not be liable to rust when the device is in use.

A further object of the invention is to furnish a sectional tire rim, with simple effective means for holding the sections in assembled relation.

Another object is to provide a sectional tire rim with improved means for preventing the rim from creeping circumferentially on the wheel, such means being constructed also to aid in disconnecting the sections of the rim.

With the foregoing objects outlined and with other objects in view, which will appear as the description proceeds, the invention consists in the novel features hereinafter described in detail, illustrated in the accompanying drawings, and more particularly pointed out in the appended claims.

Referring to the drawings:

Fig. 4 is an inner view partly in section viewed from the center of the rim.

Fig. 5 is a sectional perspective view of a portion of the locking ring forming part of the rim.

Fig. 6 is a similar view of a portion of the felly band or main part of the rim.

Fig. 7 is a detail perspective view illustrating the manner in which the locking ring may be forced into or out of position.

Figure 1:
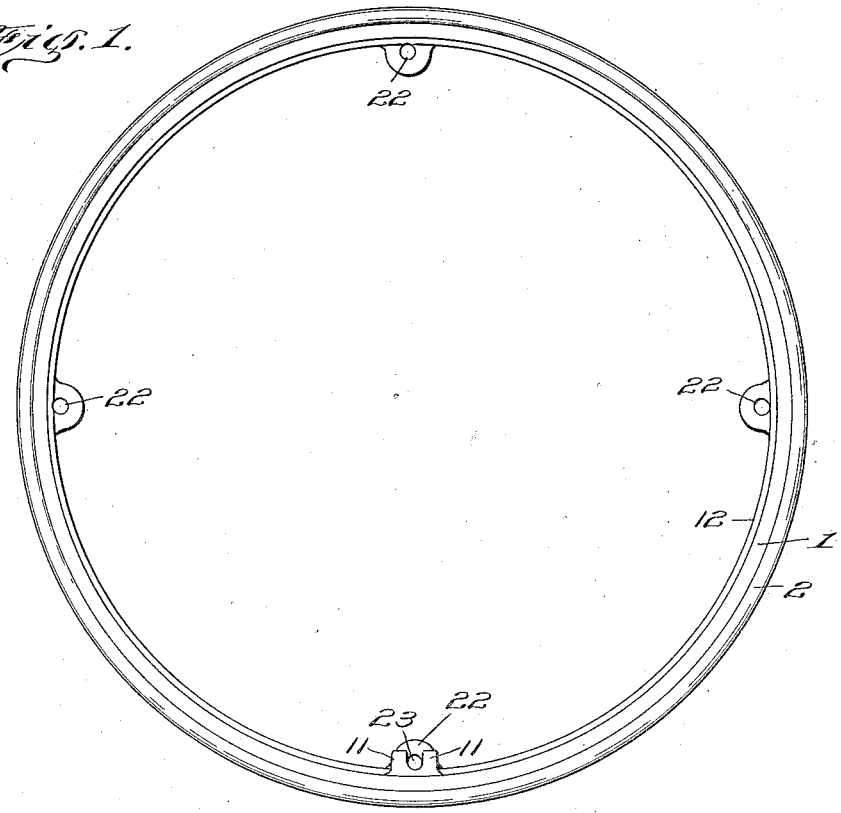
Figure 1 is a side view of the improved rim.
Figure 2:
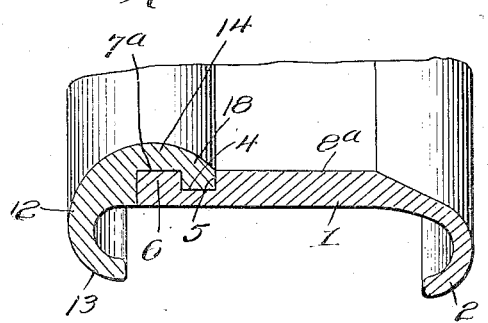
Fig. 2 is a transverse radial sectional view of the same taken on the line 2—2 of Fig. 4.
Figure 3:
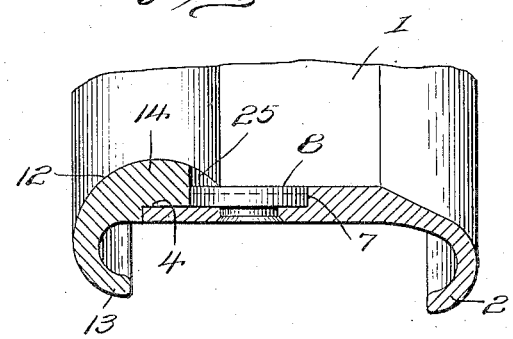
Fig. 3 is a similar sectional view taken on the line 3—3 of Fig. 4.

In the drawings, 1 designates the major part of the rim which is provided at one side with an outwardly extending annular flange 2 adapted to engage the ordinary bead at one side of a pneumatic tire casing. As best shown in Fig. 6, the inner portion of the part 1 is cut away at 3 to provide an annular rabbet 4 which merges into a radially disposed annular shoulder 5. The major part or band is provided at spaced points with inwardly extending wedge shaped lugs 6 that are spaced from the shoulder 5, for a purpose hereinafter described. Each of these lugs has its inner surface 7$^a$ flush with the inner surface 8$^a$ of the band 1 and one side edge of the lug is flush with one side edge of the band.

The band 1 is also provided with a substantially semi-cylindrical pocket 7 in which is seated a rotatable locking head 8. This head has a substantially semi-cylindrical side edge 9 and a straight side edge 10. The edge 9 is of about the same length as the side wall of the pocket 7, whereby when the head 8 is turned to a predetermined position, the straight edge 10 of the locking head will be in the same plane as the shoulder 5. When the head is turned out of this position, its curved edge will project into the recess 3 for locking purposes, as hereinafter described.

The band 1 is completed by what may be termed "fulcrum lugs" 11 which function in one instance to engage one of the rim securing bolts and prevent the band from creeping circumferentially relatively to the wheel with which the rim is used. These lugs are spaced apart, so that they may be readily straddled over a rim bolt.

With a band of the construction above described, we combine a locking ring or minor part 12 provided with an outwardly extending annular tire gripping flange 13, and having its inner portion thickened as shown at 14, for a purpose now to be described. In this thickened portion, as best shown in Fig. 5, we provide spaced pockets 15, there being the same number of pockets as there are lugs 6. Each of these pockets is cut from the outside of the ring towards its center, and the pocket has its mouth 16 opening through the inner edge 17 of the ring.

The uncut portion of the ring adjacent each pocket, provides a wedge shaped nose 18 adapted to interlock with one of the lugs 6. The mouth 16 of each pocket is of a length circumferentially, equal to the length of one of the lugs 6, so that the lugs 6 will enter the pockets when the band and ring are arranged coaxially side by side, and the ring has its mouths 16 aligned with the lugs 6 of the band. The outer portion of the ring is cut away to provide a rabbet 19 having a cylindrical surface 20 and an annular radial shoulder 21, and when the locking ring is moved against the band 1, to place the lugs 6 in the pockets 15, the surfaces 4 and 20 will slide on one another until the shoulders 5 and 17 are in close proximity to each other, and then the ring 12 may be turned relatively to the band 1, so that the lugs 6 will interlock with the noses 18.

The locking ring, is provided with the usual eyelets 22 through which the rim securing bolts pass, and when the band 1 and locking ring are assembled the aperture 23 in one of these eyelets, will align with the space between the lugs 11. Consequently these lugs may function as a fulcrum block, and an ordinary screw-driver 24 or a similar tool may be passed between the lugs 11 into the aperture 23, and may then be utilized as a lever for moving the band and locking ring circumferentially relatively to one another. When such lever has been employed to the proper extent to bring the wedge surfaces of the lugs 6 and noses 18 into tight engagement, a recess 25 in the thickened portion 14 of the locking ring, will be brought into alignment with the pocket 7, and then the screw-driver may be inserted in the slot 26 of the locking head 8, in order to turn the locking head into the position shown in Fig. 4, where it will prevent the band and locking ring from being moved relatively to one another.

It is preferred that the elements heretofore described be made of metal, but it is obvious that they may be formed of any suitable material, and it is apparent that the thickened portion 14 of the locking ring enables the pockets 15 to be formed in the ring without weakening the latter.

From the foregoing it is believed the construction and manner of assembling the parts may be readily understood, and in order to dismantle the band and ring, it may be stated that the locking head 8 is first turned to bring the straight edge 10 into the same plane as shoulder 5, and then the screw-driver or the like may be inserted between the lugs 11 into the aperture 23, and forced toward one side until the wedge surfaces of the parts 6 and 18 have been disengaged. Then when the lugs are again in register with the mouths 16 of the pockets, the locking ring may be pulled outwardly away from the band 1, and the tire may be readily removed from the rim.

While we have disclosed the preferred embodiment of the invention, we are aware that various changes may be made in the details illustrated, without departing from the spirit of the invention as expressed in the claims.

What is claimed and desired to be secured by Letters-Patent is:

1. A demountable rim including a major band, a minor band, and means for securing the bands against relative rotation, the major band having an annular rabbet in its inner side provided with a radial annular shoulder and a cylindrical surface, spaced wedge shaped lugs extending inwardly from said cylindrical surface, said minor band having an annular rabbet in its outer side provided with a radial annular shoulder and a cylindrical surface adapted to respectively engage one side edge and the cylindrical surface of the major band, pockets interrupting the cylindrical surface of the minor band and adapted to receive said lugs, the inner surface of the minor band being convexly curved transversely from one side edge of the minor band to the inner face of the major band.

2. A tire rim including a band and a locking ring, each provided with an outwardly extending tire engaging flange, bayonet joints detachably connecting said parts, fulcrum lugs extending inwardly from one of said parts, and an eyelet arranged on the other part in substantial alignment with the lugs, in order to receive a lever employed in relatively rotating said parts.

3. A tire rim including a band member and a locking member connected together by bayonet joints, each of said members having an annular radial shoulder, said shoulders being arranged to be brought into close proximity with each other when the members are connected together, each of said members having a parti-circular pocket adapted to be aligned with one another, and a rotatable locking head adapted to seat in said pockets and prevent relative rotation of the members, said locking head having a straight surface adapted to be brought into alignment with one of said shoulders, whereby said members are released to permit relative rotation of the same.

In testimony whereof we affix our signatures.

JOHN A. FLORO.
HERMAN McCARLEY.